United States Patent [19]
Weisshaar

[11] Patent Number: 5,154,061
[45] Date of Patent: Oct. 13, 1992

[54] LIQUEFACTION APPARATUS AND METHOD

[76] Inventor: Peter Weisshaar, Stiftweg 53, 4902 Bad Salzuflen, Fed. Rep. of Germany

[21] Appl. No.: 735,249

[22] Filed: Jul. 24, 1991

[30] Foreign Application Priority Data

Jul. 24, 1990 [DE] Fed. Rep. of Germany ....... 4023422

[51] Int. Cl.$^5$ .............................................. F25J 3/00
[52] U.S. Cl. ........................................ 62/11; 62/471;
62/50.5; 202/197; 122/492
[58] Field of Search ............ 62/11, 47.1, 50.5; 202/197; 122/492

[56] References Cited

U.S. PATENT DOCUMENTS

| | | | |
|---|---|---|---|
| 2,122,630 | 7/1938 | Williams | 122/492 |
| 2,994,647 | 8/1961 | Williamson et al. | 202/197 |
| 3,108,049 | 10/1963 | Bowers et al. | 202/197 |
| 3,200,050 | 8/1965 | Hogan et al. | 202/197 |
| 4,421,605 | 12/1983 | Huhta-Koivisto | 202/197 |

Primary Examiner—Ronald C. Capossela
Attorney, Agent, or Firm—Laubscher & Laubscher

[57] ABSTRACT

Liquefaction apparatus and method for removing liquid molecules from a vaporous or gaseous medium, use being made of an annular porous layer (5) of van der Waals-type material through which the medium is radially outwardly directed, the layer being rotatably driven to discharge by centrifugal force the liquid modules that are bound by van der Waals forces in the layer. The layer is mounted concentrically on the inner periphery of a rotatably driven cylindrical separator member (4) having an annular wall portion provided with a passage system at least the outlet portion of which terminates in a plurality of radial passages (17) through which the liquid molecules are centrifugally discharged. In one embodiment, the separator member is cooled by a cooling bath (18) the liquid of which is recirculated through a refrigeration-type heat exchanger (12). In a second embodiment, a portion of the liquid condensate (14) in which the separator member is at least partially submerged is cooled by passage through a refrigeration-type heat exchanger (12).

22 Claims, 4 Drawing Sheets

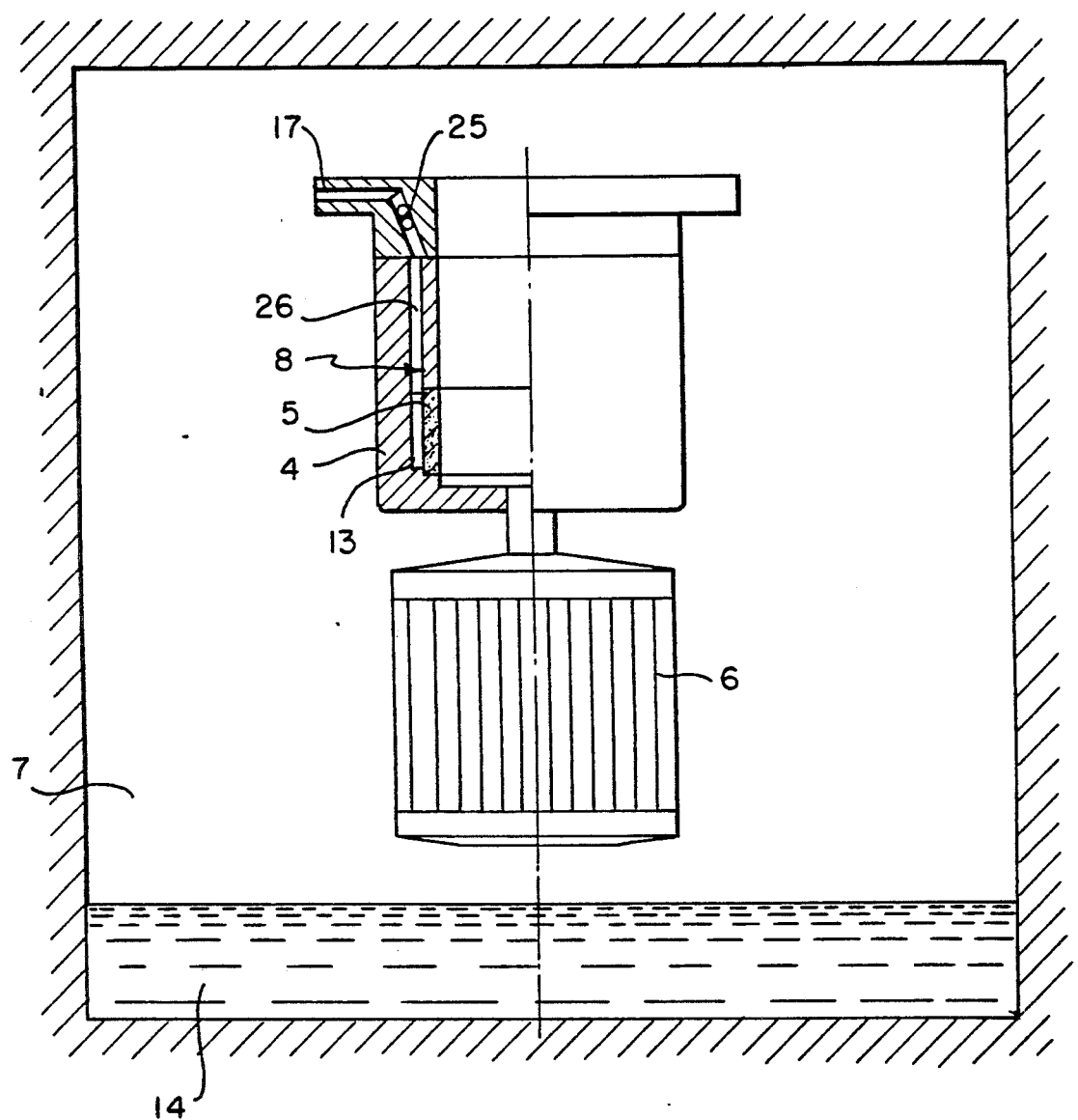
FIG. I

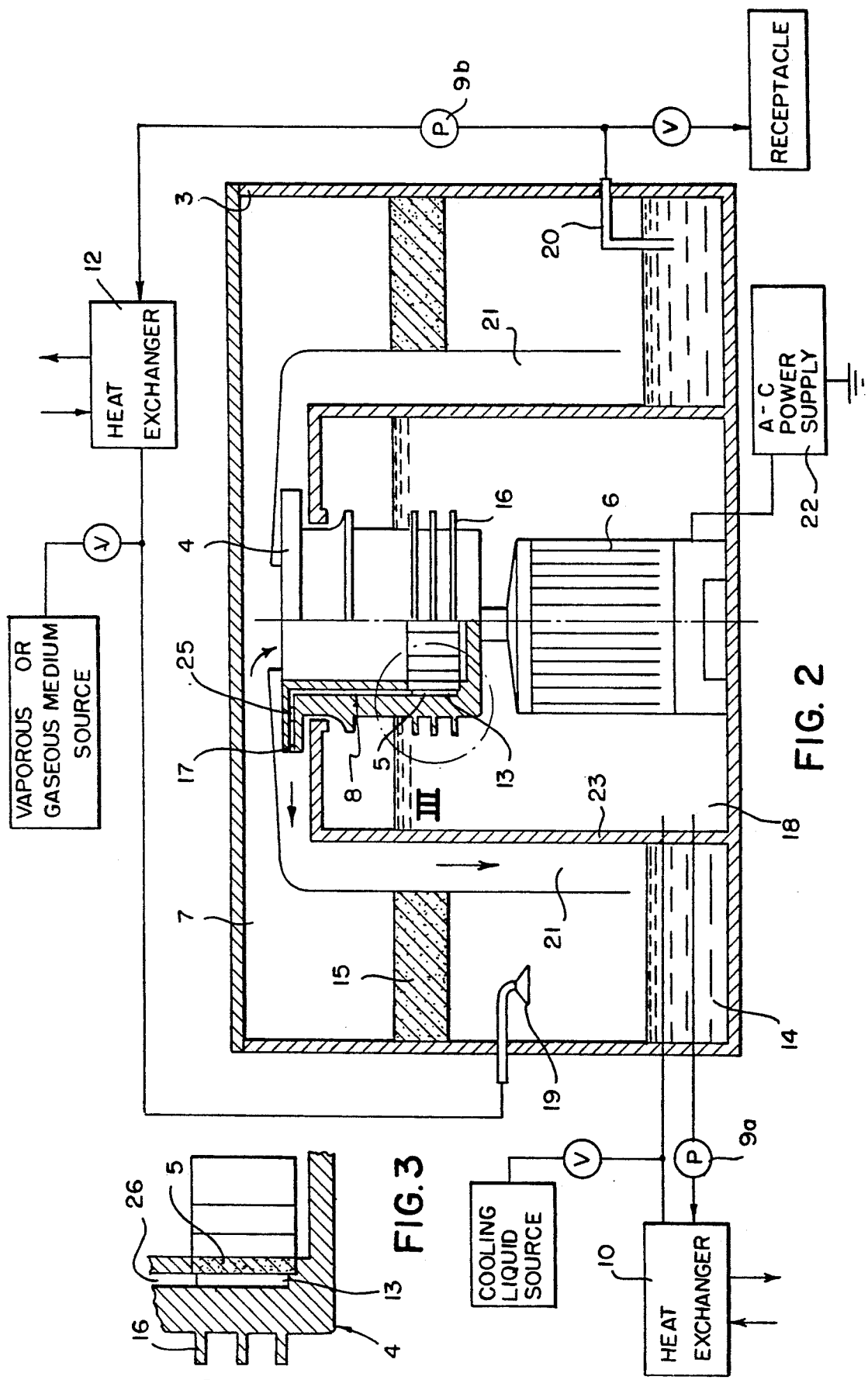

LIQUEFACTION APPARATUS AND METHOD

STATEMENT OF THE INVENTION

An apparatus and method are provided for the liquefaction of a vaporous or gaseous medium, use being made of an annular porous layer of a van der Waals-type material arranged concentrically on the inner periphery of the annular wall of a rotatably-driven cylindrical or cup-shaped separator member. The medium to be liquefied is conducted radially outwardly through the layer, those liquid molecules that are bound by van der Waals forces in the layer being discharged radially outwardly by centrifugal force from the separator via corresponding radial outlet passages formed therein.

BRIEF DESCRIPTION OF THE PRIOR ART

Liquefaction apparatus for vaporous or gaseous media are well known in the prior art. For example, there are known processes where — for the liquefaction of vaporous or gaseous media or as an extraction device for vapor or gas mixtures — use is made of compressors that work according to the displacement principle in order to suction off the particular vapors or gases and to condense them to liquefaction pressure.

This applies in a similar manner to compression cooling circuits that are based on the cold vapor principle.

Basically, however, these known processes are very cost-intensive as regards both as the equipment and the actual performance of the process. Furthermore, the energy expenditure is relatively high and that likewise is counterproductive in terms of optimum economic operation.

Accordingly, the present invention was developed to provide a process by means of which one can suction off and liquefy many different vaporous or gaseous media with the least possible energy expenditure.

SUMMARY OF THE INVENTION

A primary object of the present invention is to provide a method and apparatus for the liquefaction of vaporous or gaseous media, use being made of an annular porous layer of a van der Waals-type material arranged concentrically within a rotatable driven cylindrical or cup-shaped separator member, whereby the liquid molecules found by van der Waals forces in the porous layer are discharged radially outwardly of the separator member for collection in a liquid condensate bed.

In contrast to the known compression process based on the displacement principle, according to the present invention, no vapor or gas volumes are suctioned off and compressed. Instead, independently of the density or the specific volume of the vapor of gas to be liquefied, only the vapor or gas molecules are adsorptively bound by means of van der Waals shearing forces and are liquefied and, subsequently, along with simultaneous heat evacuation, are transported to a higher pressure level by means of the centrifugal forces appearing during rotation. Here, the process exploits the ability of the molecular sieve/drying agent to bind adsorptively the molecules of vapors of water or the like, or industrial gases, whereby the effect of these drying agents/molecular sieves is based on a very large active surface according to which the liquid molecules, as mentioned before, are retained by the van der Waals forces. As molecular sieves, one can use, for example, aluminum oxide or silicon oxide compounds. The drying agent can be made up of silica gel.

Using this process, it is possible, in particular, also to achieve the oil-free liquefaction of vapors or gases with a large specific volume in the low-pressure range. In this way, one can, or example, in certain temperature ranges, replace the environmentally harmful FCKW refrigeration agents by means of water as refrigeration agent.

The liquid molecules that are bound in a drying agent/molecular sieve ring are discharged radially outwardly by the centrifugal forces appearing during rotation, so that they exit on the outside of the ring. But this does not apply to vapor/gas molecules that are absorbed into the crystalline structure of the drying agent/molecular sieve. Assuming that the separator is arranged in a closed chamber, the pressure on the outside of the ring increases and finally becomes equal to or greater than the liquefaction pressure of the transported liquid molecules. Basically, the effect of the process rests on the fact that the occurring centrifugal forces during the rotation of the ring are greater than the van der Waals forces with which the liquid molecules are retained along the inside surface of the ring.

According to a more specific object of the invention, heat removal means are provided for continuously cooling the separator, since because of their kinetic energy, the absorbed steam/gas molecules produce a warming of the annular porous layer that reduces its effectiveness.

According to another object of the invention, the annular porous layer of van der Waals-type material is mounted concentrically on the inner surface of a rotatably-driven cylindrical or cup-shaped separator member that contains passage means affording communication between the inner and outer peripheral surfaces thereof. The separator member is formed of a material having good heat conductivity, means being provided for cooling at least part of the separator member to maintain the effectiveness of the annular porous layer. The passage means terminates in a plurality of radial passages through which liquid molecules entrained in the annular layer are discharged outwardly by centrifugal force upon rotation of the separator member.

According to one embodiment of the invention, cooling of the rotatably-driven separator member is achieved by partially submerging the same in a cooling liquid bath, heat exchanger means being provided for removing heat from the cooling liquid. According to another embodiment, the rotatably-driven separator member is partially submerged in the liquid condensate both, whereupon a portion of the liquid condensation is cooled by a separate heat exchanger.

BRIEF DESCRIPTION OF THE DRAWING

Other objects and advantages of the invention will become apparent from a study of the following specification, when viewed in the light of the accompanying drawing, in which:

FIG. 1 is a sectional view of a first embodiment of the invention;

FIG. 2 is a sectional view of a complete liquefaction system using a separator similar to that of FIG. 1 partially submerged in a cooling liquid bath;

FIG. 3 is a detailed sectional view of the portion indicated by the reference III in FIG. 2;

DETAILED DESCRIPTION

Figure 4:
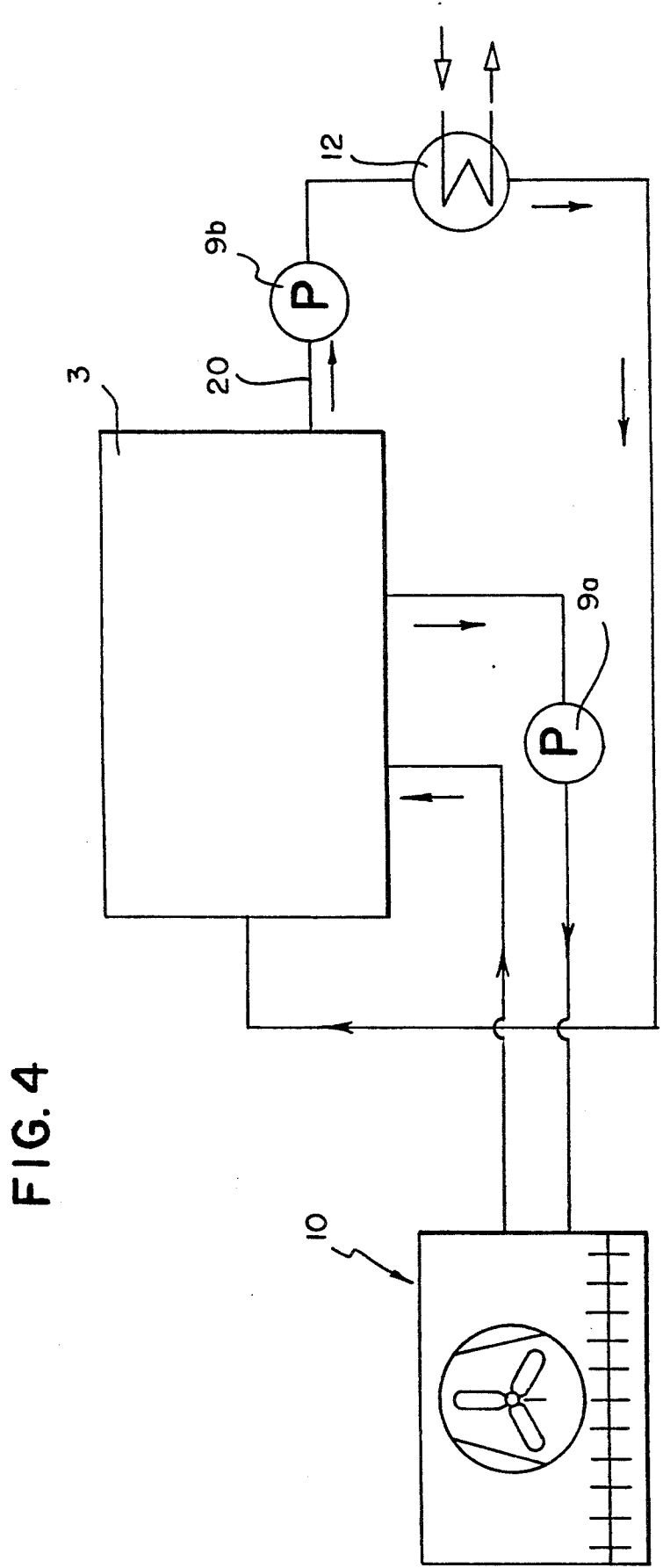
FIG. 4 is a block diagram of the heat exchange connections for the apparatus of FIG. 3, wherein the cooling medium is cooled by one heat exchanger, and the vaporous or gaseous medium is heated by another heat exchanger.

Referring first more particularly to FIG. 1, the liquefaction system of the present invention includes a housing containing a low pressure chamber 7 in which is mounted a cup-shaped or cylindrical separator 4 that is rotatably driven by an alternating-current motor 6. Arranged concentrically within the separator member 4 is an annular porous layer 5 formed of a van der Waals-type material, such as aluminum, oxide or S lithium compounds. Alternatively, a drying agent — such as a silica gel — could be provided. The separator member contains a annular gap 13 that extends concentrically about the annular layer 5, which annular gap 13 is connected with the low pressure chamber 7 via passage means including longitudinal ducts 26, and a plurality of radially outwardly directed passages 17. Mounted in the passage means between the longitudinal portions 26 and the radial portions 17 are spring-biased relief valve means 25, respectively, whereby the gap 13 and longitudinal passages 26 define a high-pressure chamber 8. The separator member 5 is rotatably driven by a drive motor 6 which, as shown in FIG. 2, is supplied with alternating-current power from source 22. In the embodiment of FIG. 2, the lower portion of the separator member 4 and the entire drive motor 6 are submerged in a cooling liquid bath 18, thereby to cool the exterior portion of the separator member and to maintain the efficiency of the annular porous layer 5. In order to increase the cooling effect, the submerged portion of the separator may be provided with annular cooling ribs 16. In the embodiment of FIGS. 2-4, vaporous or gaseous media within the low pressure chamber 7 is drawn by suction into the interior of the rotatably driven separator member 4, whereupon as the fluid passes radially outwardly through the annular layer 5, a number of liquid molecules are bound on the porous surfaces of the layer 5 owing to van der Waals forces. Owing to centrifugal force produced by the rotating separator member, the liquid molecules are thrown centrifugally out of the annular layer 5, and are introduced into the annular gap 13 of the high-pressure chamber 8, whereupon the relief valves 25 open when the pressure of the liquid molecules exceeds the closing force of the spring biasing means. Consequently, the liquid molecules are then discharged radially outwardly through the outlet passageway 17 owing to the centrifugal force produced by the rotating separator member 4. As shown in FIG. 2, the liquid molecules are collected in a return duct 21 having an annular portion at its upper end arranged concentrically about the radial passages 17. Liquid molecules collected in the upper portion of the return duct are then deposited downwardly through the conduit 21 toward the condensed liquid bath 14.

In accordance with an important feature of the present invention, cooling liquid from the cooling chamber 18 is pumped by first pump means 9a to first heat exchanger means 10, which comprises a conventional refrigeration type system. The cooling liquid is then returned to the cooling chamber 18, so that the heat exchanger 10 removes the heat produced by the liquefaction process. Similarly, a portion of the liquid condensate in the liquid condensate bath 14 is removed via outlet 20 and is pumped by second pump means 9b through the heat exchanger 12, which heat exchanger is operable to heat the condensed liquid to its vaporous or gaseous state, whereupon the vaporous or gaseous medium is returned to the low pressure chamber 7 via the spray nozzle means 19. The vaporous or gaseous material is then drawn by suction upwardly through annular demisting means 15 arranged concentrically about the cooling chamber 18 and the downwardly directed duct means 21. Thus, the demisting means 15 prevent liquid molecules from being drawn upwardly for recirculation through the separator member 4.

In the practical example shown in FIGS. 2-4, the high-pressure chamber 8 is formed by the annular gap 13 as well as boreholes 26, in that a pressure level is developed that is above the liquefaction pressure so that the exiting steam or gas molecules are liquefied into a condensate.

High-pressure chamber 8 and low-pressure chamber 7 are separated by relief valves 25 that act as throttle means and that are arranged in the area of transition between boreholes 26 and openings 17. The annular demisting package 15 provided in low-pressure chamber 7 serves as a liquid droplet separator.

OPERATION

During practical operation, the entire system is first evacuated and the cooling liquid is filled into cooling chamber 18 or into the pipes belonging to the cooling circuit and the heat exchanger 10. Next, the vaporous medium, in this case, wet steam, is injected into the corresponding pipeline system, the utility heat exchanger 12, and low-pressure chamber 7.

Simultaneously with the start of drive motor 6, circulating pumps 9b and 9a are operated, one of which transports the condensed liquid 14 located in low-pressure chamber 7 through utility heat exchanger 12, while the other one transports the cooling liquid to the heat exchanger 10. Partial evaporation takes place in utility heat exchanger 12 which, for example, comprises the structural component of an air conditioning system, with a steady heat supply going to that exchanger. The existing wet steam is suctioned inwardly via the open side of rotation cylinder 4 and is adsorbed and liquefied in ring 5 in certain proportions.

Amid heat evacuation, the developing condensate is expanded on the way via boreholes 26 and relief valve 25, not shown in FIG. 3, to a return duct and is then supplied to low-pressure chamber 7. During the expansion phase, there is a partial evaporation of the condensate, in a manner similar to what happens in an expansion valve within a compression cooling circuit.

Expansion takes place from liquefaction pressure toward evaporation pressure and the developing condensate is cooled from liquefaction temperature down to evaporation temperature and in the process again absorbs the internal energy of the water to be evaporated.

The developing waste and condensation heat is given off to the air, water, gas or other media via the coolant and heat exchanger 10.

To prevent the formation of droplets in the suctioning area of rotation cylinder 4, low-pressure chamber 7, as described before, contains the annular demisting package 15 arranged above the spray means 19 via which is supplied the wet steam generated in the utility heat exchanger 12.

Figure 5:
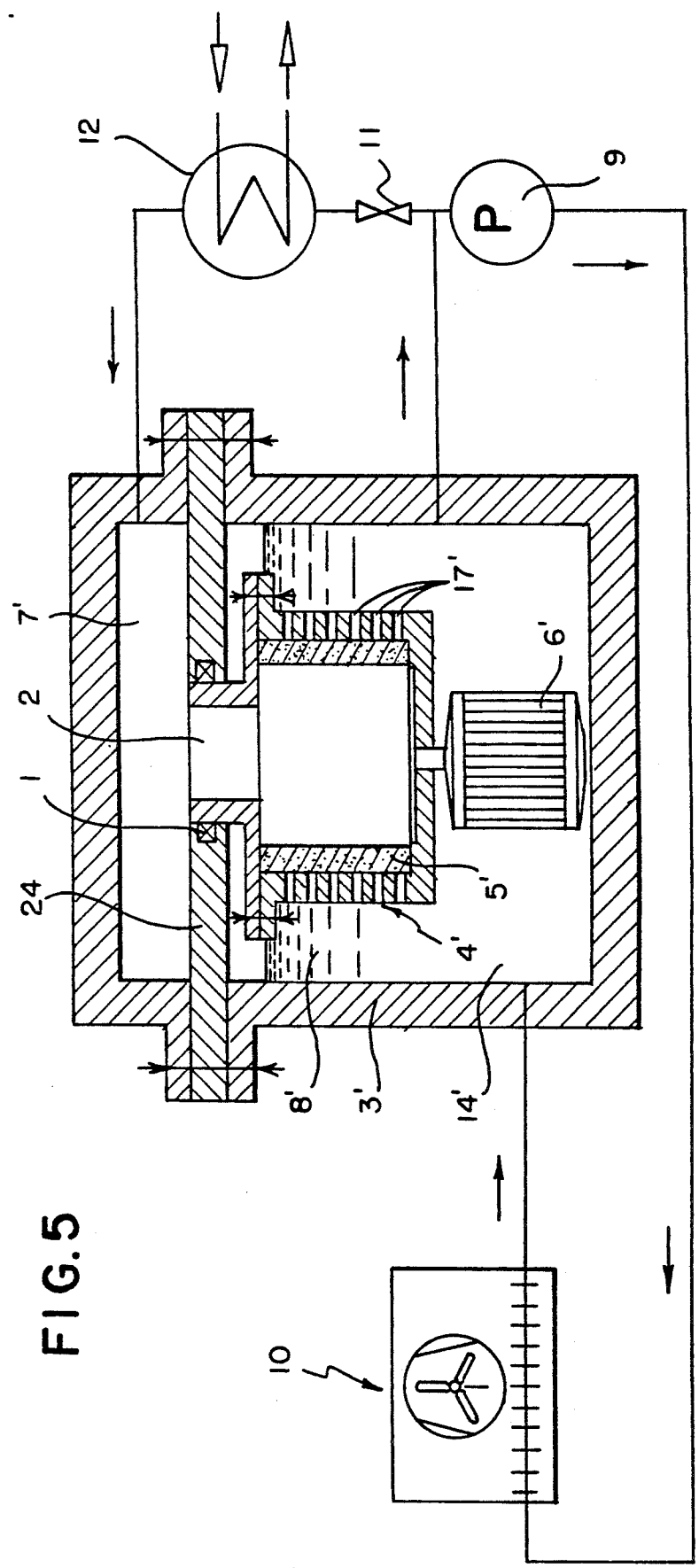
FIG. 5 is a sectional view of another embodiment of the invention.

Referring now to the embodiment of FIG. 5, the system is a single substance system with direct heat evacuation of the separator member 4', as distinguished from the two-substance system of FIGS. 2-4.

In this embodiment, the housing 3' includes a horizontal partition wall 24 that separates the interior of the housing into an upper low-pressure chamber 7' and a lower high-pressure chamber 8'. The rotatably driven cup-shaped separator member 4' includes a neck portion 2 that extends upwardly through an opening contained in the horizontal partition 24, thereby to provide continuous communication between the low-pressure chamber 7' and the interior of the separator member. A gland or O-ring seal member 1 is arranged concentrically about the rotary neck portion 2, thereby to seal the upper and lower chambers 7' and 8' from each other. The interior of the separator member 4' is covered by the annular layer 5' of the porous van der Waals-type material, the annular wall portion of the separator member containing radially-extending through bores 17. The lower portion of the separator member and the drive motor 6' are submerged within a liquid condensate bath 14'. A portion of the liquid condensate 14' is transmitted by pump 9 to the refrigeration type heat exchanger 10 which provides the desired cooling of the liquid condensate. Another portion of the liquid condensate is supplied via restrictor 11 to the heat exchanger 12, which heat exchanger converts the condensate liquid to the vaporous of gaseous state for reintroduction into the low pressure chamber 7'. In the illustrated embodiment, water is selected as the medium under consideration.

OPERATION

In this practical example, one must first evacuate container 3' as well as the associated pipelines and secondary units, before there is any filling with water. After that, separator 4' is rotatably driven via motor 6', and the circulating pump 9 as well as the series-connected heat exchanger 10 are placed in operation. After separator 4' and the annular layer 5' have reached the desired rpm, any liquid that is possibly present is transported radially via the molecular body of layer 5', out of the inside of separator 4', followed by the water vapor that is bound and liquefied by van der Waals forces. A pressure difference is built up between low-pressure chamber 7' or the inside of separator 4, on the one hand, and high-pressure chamber 8, on the other hand. Radially arranged openings 17' are provided in separator 4' to facilitate the exit of the condensate, released from layer 5' into the high-pressure chamber 8'.

Circulating pump 9 constantly circulates a portion of the developing condensate quantity and this is again supplied via heat exchanger 10 to high-pressure chamber 8'. As a result, separator 4', or the other parts that are heating up, are cooled down, that is to say, the generated waste and condensation heat is evacuated. A part of the liquid stream, conducted through the heat exchanger 10, is branched off and is supplied, via a throttle 11, arranged in front of utility heat exchanger 12, to the latter. The heat supply to utility heat exchanger 12 results in constant evaporation and thus influx of steam/gas molecules to low-pressure chamber 7'. The developing liquid molecules are moved, via suction pipe 2, to the interior of annular layer 5 and there they are absorbed in certain proportions as described. Depending on the operating conditions, the feeder stream is charged with a gas part between high-pressure chamber 8' and heat exchanger 10 to a certain extent.

After heat evacuation in heat exchanger 10, all gas parts are condensed so that there is only liquid in the pipeline.

Because only minor pressure differences result between high-pressure chamber 8' and low-pressure chamber 7' in the practical example shown in FIG. 5, requirements are made only for the sealing between gland 1 and partition 24, whereby the provision of expensive design measures is avoided.

Besides, a possibly minor leakage in the area of the seal signifies merely an impairment of the efficiency but not an impairment of the operation as such.

In contrast to a condensation according to the displacement principle — where a gas or steam volume is sucked in and is condensed with alternating polytropic exponent to liquefaction pressure — looking at the process according to the invention, assuming a certain efficiency, only the gas/steam molecules, that move at high speed in low-pressure chamber 7', are trapped by means of van der Waals forces.

Influx of the steam/gas molecules to the inside annular surface of rotating layer 5 is comparable to the influence of gas/steam molecules in a jet apparatus. Because of the relatively high speed of the steam molecules (in case of water vapor in the range of $+4°$ C. slightly overheated, the average speed is more than 600 m/sec), the suction cross section present over the separator 4 is dimensioned more than adequate to make sure that the molecules to be adsorbed will constantly continue to flow.

The precise surface, the type of drying agent or molecular sieve, as well as the rpm geometry of the rotating layer 5 will depend on the substance to be condensed and can be determined in advance theoretically although they can also be determined empirically regarding the ratio between impacting and adsorbed steam/gas molecules per unit time.

The thickness of layer 5 must be so dimensioned that one can prevent after-evaporation of the already liquefied steam/gas from the outside in the direction toward the inside of the rotating layer 5. At the same time, the thickness of layer 5 must be sufficient to ensure heat evacuation to the outside. The latter can be improved, for example, by using an alloy or sintering between the driving agent/molecular sieve material and a neutral, well heat-conducting substance, such as, for example, aluminum.

The output to be indicated is determined by the steam/gas molecules that are accelerated to circumferential speed, the liquid friction losses on the outside or rotation cylinder 4, the power consumption of the secondary units, as well as the efficiency of motor 6 with possibly connected frequency transformer.

The process, which was explained by way of example with the help of water vapor, can of course also be used for other industrial gases as well as higher-molecular substances. Other suitable vaporous or gaseous media include Benzol, nitrogen, oxygen, or hydrogen. The cooling fluid of chamber 18 of the embodiment of FIG. 2 may be a suitable non-volatile fluid, such as oil. The rotational velocity of the separator cylinder is such as to give the desired centrifugal force to the liquid molecules to be discharged. The centrifugal force should be in the range of 5.000 g (where $g=9.81$ m/sec$^2$). The centrifugal force for example, is produced by a separator cylinder having a diameter of about 400 mm and a rotational speed of about 6000 min$^{-1}$.

What is claimed is:

1. Apparatus for the liquefaction of a vaporous or gaseous medium, comprising:
   (a) a housing (3) containing a low pressure chamber (7) for receiving the medium to be liquified;
   (b) a rotatably driven generally cup-shaped separator member (4) mounted within said housing, said separator member including an annular wall portion containing passage means affording communication between the internal and external peripheral surfaces of said separator member, at least the outlet end portion of said passage means comprising a plurality of radial passages (17) adjacent the external surface of said annular wall portion, the interior of said separator member being in constant communication with said low pressure chamber, whereby the medium is drawn by suction within the interior of the separator member owing to the rotation thereof;
   (c) means including an annular porous layer of van der Waals adsorptive material (5) arranged adjacent the internal circumferential surface of said annular wall portion for removing from said medium liquid molecules that are retained on said layer and are discharged by centrifugal force radially outwardly from said separator member via said radial passages; and
   (d) means (14) for collecting the liquid molecules to define a liquid bed.

2. Apparatus as defined in claim 1, and further including means (10) for cooling at least a portion of the external surface of said separator member.

3. Apparatus as defined in claim 1, wherein said housing is hermetically sealed.

4. Apparatus as defined in claim 1, wherein the axial dimension of said annular layer (5) is less than that of said annular wall portion; and further wherein said separator member contains an annular high-pressure chamber (13) arranged concentrically outwardly around said annular layer, said passage means also including a plurality of passages (26) extending longitudinally of said annular wall portion and in communication at opposite ends with said high pressure chamber and with said radial passages, respectively.

5. Apparatus as defined in claim 4, and further including a plurality of normally-closed spring-biased pressure relief valves arranged generally in said passage means adjacent the junctures of said longitudinal and radial passages, respectively, said pressure relief valves being opened when the pressure of the liquid molecules in said high-pressure chamber exceeds a given value.

6. Apparatus as defined in claim 4 wherein the longitudinal axis of said separator member is vertical; and further wherein said low pressure chamber (7) extends above said separator member in direct communication with the interior thereof.

7. Apparatus as defined in claim 6, and further wherein said housing contains a cooling chamber (18) within which the bottom portion of said annular member extends, said radial passages (17) being contained in the upper portion of said separator member above said cooling chamber.

8. Apparatus as defined in claim 7 wherein said low-pressure chamber includes an annular portion extending concentrically downwardly about said cooling chamber; and further including return duct means (21) for depositing the liquid molecules ejected by said separator member into said liquid bed, said return duct means including an annular inlet portion extending concentrically about the outlets of said radial passages, and a second portion extending downwardly externally of said cooling chamber and terminating in spaced relation above said liquid bed.

9. Apparatus as defined in claim 8, and further including annular demisting means (15) arranged in said low pressure chamber (7) concentrically about said return duct means, whereby the medium in the lower part of said low pressure chamber adjacent said liquid bed is drawn by suction by said annular member for recirculation upwardly through said demisting means.

10. Apparatus as defined in claim 8, and further including a cooling liquid contained in said cooling chamber for cooling at least the lower portion of said separator member, and further including first heat exchanger means (10) for cooling said cooling liquid.

11. Apparatus as defined in claim 10, and further including second heat exchanger means (12) for heating to a vaporous condition a portion of the liquid condensate in said liquid bed, and means (19) for returning to said low pressure chamber the vaporized liquid condensate produced by said second heat exchanger means.

12. Apparatus as defined in claim 11, and further including motor means (6) arranged in said cooling chamber for driving said separator member, said cooling motor being submerged in said cooling liquid.

13. Apparatus as defined in claim 1, wherein said separator member is arranged with its longitudinal axis extending vertically, and wherein said housing includes a horizontal partition (24) which defines therein an upper and a lower chamber, said upper chamber being the low pressure chamber and the lower chamber defining a high pressure chamber (8) within which said separator member is mounted, said separator member including an annular neck portion extending upwardly in rotatably sealed relation within an opening contained in said partition, said neck portion affording constant communication between said low pressure chamber and the interior of said separator member.

14. Apparatus as defined in claim 13, wherein said liquid bed (14) generally fills said high pressure chamber, and further including first heat exchanger means (10) for cooling a first portion of said liquid bed (14) and for returning the cooled liquid bed to said high pressure chamber.

15. Apparatus as defined in claim 14, and further including second heat exchanger means (12) for heating to a vaporous condition a second portion of said liquid bed, and for supplying the vaporized liquid bed to said low pressure chamber.

16. Apparatus as defined in claim 15, and further including drive motor means (6) arranged in said high pressure chamber for driving said separator member.

17. Apparatus as defined in claim 1, wherein said annular layer is formed from aluminum oxide.

18. Apparatus as defined in claim 1 wherein said annular layer is formed from silicon oxide.

19. Apparatus as defined in claim 1, wherein said annular layer includes a silica gel.

20. A method for the liquefaction of a vaporous or gaseous medium, comprising the steps of:
   (a) providing an annular porous layer of van der Waals adsorptive material;
   (b) introducing the medium within said annular layer;

(c) rotating the annular layer about its longitudinal axis to discharge radially outwardly therefrom by centrifugal force the liquid molecules of the medium formed on said layer; and (d) collecting the liquid molecules to form a liquid bed.

21. The method defined in claim 20, and further including the steps of:

(e) supplying a portion of the liquid bed to a heat exchanger (12) which heats the liquid to its vaporous form; and (f) recirculating to the interior of the rotating layer the vapors medium produced by said heat exchanger.

22. The method as defined in claim 21, and further including the steps of cooling the annular layer.

* * * * *